United States Patent
Chen et al.

(10) Patent No.: US 10,921,803 B2
(45) Date of Patent: Feb. 16, 2021

(54) METHOD AND DEVICE FOR CONTROLLING FLIGHT OF UNMANNED AERIAL VEHICLE AND REMOTE CONTROLLER

(71) Applicant: GUANGZHOU XAIRCRAFT TECHNOLOGY CO., LTD, Guangdong (CN)

(72) Inventors: Jiaxiang Chen, Guangdong (CN); Anping Xie, Guangdong (CN); Yanqiang Xiao, Guangdong (CN)

(73) Assignee: Guangzhou Xaircraft Technology Co., Ltd., Guangdong (CN)

( * ) Notice: Subject to any disclaimer, the term of this patent is extended or adjusted under 35 U.S.C. 154(b) by 93 days.

(21) Appl. No.: 16/304,938

(22) PCT Filed: May 26, 2017

(86) PCT No.: PCT/CN2017/086183
§ 371 (c)(1),
(2) Date: Nov. 27, 2018

(87) PCT Pub. No.: WO2017/202381
PCT Pub. Date: Nov. 30, 2017

(65) Prior Publication Data
US 2019/0371184 A1    Dec. 5, 2019

(30) Foreign Application Priority Data
May 27, 2016    (CN) .......................... 201610368832.8

(51) Int. Cl.
*G05D 1/00*    (2006.01)
*B64C 39/02*    (2006.01)
(Continued)

(52) U.S. Cl.
CPC ......... *G05D 1/0044* (2013.01); *B64C 39/024* (2013.01); *G05D 1/0033* (2013.01);
(Continued)

(58) Field of Classification Search
USPC ............................................................ 701/3
See application file for complete search history.

(56) References Cited

U.S. PATENT DOCUMENTS

| 2007/0018052 A1 | 1/2007 | Eriksson |
| 2010/0286859 A1 | 11/2010 | Feigh et al. |

(Continued)

FOREIGN PATENT DOCUMENTS

| CN | 102854886 A | 1/2013 |
| CN | 104035446 A | 9/2014 |

(Continued)

OTHER PUBLICATIONS

International Search Report with Written Opinion dated Aug. 25, 2017 in corresponding international application No. PCT/CN2017/086183 (12 pages).

(Continued)

*Primary Examiner* — Tyler D Paige
(74) *Attorney, Agent, or Firm* — Jeffri A. Kaminski; Venable LLP

(57) ABSTRACT

A flight control method and device for an unmanned aerial vehicle and a remote controller are provided. The method includes that: multiple pieces of locating data obtained by a locating operation are acquired in a remote controller; multiple target positions are determined according to the multiple pieces of locating data; a flight route is calculated according to the multiple target positions; and the flight route is sent to the unmanned aerial vehicle for flight (Continued)

according to the flight route. According to the method, carrying of multiple sets of equipment is avoided, and hardware cost is reduced.

20 Claims, 6 Drawing Sheets

(51) Int. Cl.
*G08G 5/00* (2006.01)
*G05D 1/10* (2006.01)

(52) U.S. Cl.
CPC .............. *G05D 1/10* (2013.01); *G08G 5/0034* (2013.01); *G08G 5/0039* (2013.01); *G08G 5/0069* (2013.01); *B64C 2201/12* (2013.01); *B64C 2201/146* (2013.01)

(56) References Cited

U.S. PATENT DOCUMENTS

| | | | |
|---|---|---|---|
| 2014/0303814 A1* | 10/2014 | Burema | A01B 79/005 701/3 |
| 2015/0064657 A1 | 3/2015 | Hales et al. | |
| 2015/0094883 A1 | 4/2015 | Peeters et al. | |
| 2016/0019560 A1* | 1/2016 | Benkert | G06Q 30/0201 700/284 |
| 2016/0050840 A1 | 2/2016 | Sauder et al. | |
| 2019/0371184 A1* | 12/2019 | Chen | G05D 1/0033 |

FOREIGN PATENT DOCUMENTS

| | | |
|---|---|---|
| CN | 104503464 A | 4/2015 |
| CN | 105159319 A | 12/2015 |
| CN | 105241470 A | 1/2016 |
| CN | 105549620 A | 5/2016 |
| CN | 205210692 U | 5/2016 |
| CN | 205239936 U | 5/2016 |
| CN | 106054917 A | 10/2016 |
| EP | 1462898 A2 | 9/2004 |
| KR | 101056377 B1 | 8/2011 |
| KR | 101117207 B1 | 3/2012 |
| WO | 2015181033 A1 | 12/2015 |

OTHER PUBLICATIONS

Japanese Office Action in corresponding Japanese Application No. 2018-562165 dated Nov. 15, 2019 (6 pages).
Korean Office Action in corresponding Korean Application No. 10-2018-7035477 dated Dec. 16, 2019 (11 pages).
Extended European Search Report in corresponding European Application No. 17802227.3 dated Dec. 19, 2019 (8 pages).

* cited by examiner

METHOD AND DEVICE FOR CONTROLLING FLIGHT OF UNMANNED AERIAL VEHICLE AND REMOTE CONTROLLER

CROSS-REFERENCE TO RELATED APPLICATIONS

This application is a U.S. National Stage application of PCT/CN2017/086183, filed May 26, 2017 and published on Nov. 30, 2017 as WO/2017/202381, which claims the benefit of Chinese Patent Application No. 201610368832.8, filed May 27, 2016, all of which are hereby incorporated by reference in their entireties.

TECHNICAL FIELD

The embodiments of the present disclosure relate to the technical field of unmanned aerial vehicles, and particularly to a method for controlling flight of an unmanned aerial vehicle, a device for controlling flight of the unmanned aerial vehicle and a remote controller.

BACKGROUND

At present, along with technical development of unmanned aerial vehicles in the field of agricultural plant protection, a user may control takeoff and landing of an unmanned aerial vehicle through a remote controller and transmit a route to the unmanned aerial vehicle, and the unmanned aerial vehicle flies from a takeoff place according to the route.

For enabling an unmanned aerial vehicle to safely and accurately execute a pesticide spraying operation, it is usually necessary to obtain geographic information, for example, coordinate data of a boundary of a farmland and coordinate data of a boundary of an obstacle, configured to generate accurate route data.

At present, as shown in FIG. 1, a user is required to acquire geographic information through a handheld surveying and mapping acquirer 20, after acquisition is completed, the handheld surveying and mapping acquirer 20 uploads it to a route edition terminal 10 (for example, a computer and a server), and the route edition terminal 10 generates route data and downloads it to a remote controller 30.

In such a control manner, the user may implement autonomous flight of the unmanned aerial vehicle at least with three pieces of equipment, i.e., the handheld surveying and mapping acquirer 20, the route edition terminal 10 and the remote controller 30, system complexity is relatively high, the user is required to carry more equipment every time when using the unmanned aerial vehicle to execute tasks of agricultural plant protection and the like, and hardware cost is high.

On the other aspect, operations required to be executed by the user for data exchange among multiple pieces of equipment are excessively tedious, and a lot of operation time is required to be consumed before the unmanned aerial vehicle is controlled to fly autonomously, so that operation efficiency of the unmanned aerial vehicle is reduced.

Moreover, the handheld surveying and mapping acquirer 20, the route edition terminal 10 and the remote controller 30 are mostly equipment of different types, and there may exist a certain probability of occurrence of an error during data exchange no matter whether wired, wireless and data transfer manners and the like are adopted, so that operation reliability of the unmanned aerial vehicle is reduced.

SUMMARY

In order to solve the problems, the embodiments of the application disclose a method for controlling flight of an unmanned aerial vehicle, which includes that:
multiple pieces of locating data obtained by a locating operation are acquired in a remote controller;
multiple target positions are determined according to the multiple pieces of locating data;
a flight route is calculated according to the multiple target positions; and
the flight route is sent to the unmanned aerial vehicle for flight according to the flight route.

In some embodiments of the application, the step that the multiple pieces of locating data obtained by the locating operation are acquired in the remote controller includes that:
multiple original locating parameters obtained by the locating operation over the remote controller are read in the remote controller; and
the multiple original locating parameters are encapsulated into the multiple pieces of locating data according to a specified format.

In some embodiments of the application, the step that the multiple target positions are determined according to the multiple pieces of locating data includes that:
an electronic map is displayed;
multiple locating positions are read from the multiple pieces of locating data according to the specified format;
locating point icons are displayed in the electronic map according to the multiple locating positions; and
when a confirmation operation for the locating point icons is detected, the locating positions corresponding to the locating point icons are confirmed to be the target positions.

In some embodiments of the application, the step that the multiple target positions are determined according to the multiple pieces of locating data further includes that:
a deletion operation for the locating point icons corresponding to the target positions is detected; and
positions of the locating point icons are canceled to be determined as the target positions according to the deletion operation.

In some embodiments of the application, the step that the multiple target positions are determined according to the multiple pieces of locating data further includes that:
a movement operation for the locating point icons corresponding to the target positions is detected;
the locating point icons are moved in the electronic map according to the movement operation; and
positions corresponding to the moved locating point icons are queried as the target positions.

In some embodiments of the application, the step that the flight route is calculated according to the multiple target positions includes that:
the multiple target positions are connected to generate a flight region; and
the flight route is calculated in the flight region.

The embodiments of the application further disclose a device for controlling flight of an unmanned aerial vehicle, which includes:
a locating data acquisition module, configured to acquire multiple pieces of locating data obtained by a locating operation in a remote controller;

a target position determination module, configured to determine multiple target positions according to the multiple pieces of locating data;

a flight route calculation module, configured to calculate a flight route according to the multiple target positions; and a flight route sending module, configured to send the flight route to the unmanned aerial vehicle for flight according to the flight route.

In some embodiments of the application, the locating data acquisition module includes:

an original locating parameter reading submodule, configured to read multiple original locating parameters obtained by the locating operation over the remote controller in the remote controller; and a positioning data encapsulation submodule, configured to encapsulate the multiple original locating parameters into the multiple pieces of locating data according to a specified format.

In some embodiments of the application, the target position determination module includes:

an electronic map display submodule, configured to display an electronic map;

a locating position reading submodule, configured to read multiple locating positions from the multiple pieces of locating data according to the specified format;

a locating point icon display submodule, configured to display locating point icons in the electronic map according to the multiple locating positions; and a position determination submodule, configured to, when a confirmation operation for the locating point icons are detected, confirm the locating positions corresponding to the locating point icons to be the target positions.

In some embodiments of the application, the target position determination module further includes:

a deletion operation detection submodule, configured to detect a deletion operation for the locating point icons corresponding to the target positions; and a target position deletion submodule, configured to cancel positions of the locating point icons to be determined as the target positions according to the deletion operation.

In some embodiments of the application, the target position determination module further includes:

a movement operation detection submodule, configured to detect a movement operation for the locating point icons corresponding to the target positions;

a locating point icon movement submodule, configured to move the locating point icons in the electronic map according to the movement operation; and a position query submodule, configured to query positions corresponding to the moved locating point icons as the target positions.

In some embodiments of the application, the flight route calculation module includes:

a flight region generation submodule, configured to connect the multiple target positions to generate a flight region; and a route calculation submodule, configured to calculate the flight route in the flight region.

The embodiments of the application further disclose a remote controller, which includes a locating module, a display and a device for controlling flight of an unmanned aerial vehicle, wherein the device for controlling flight of the unmanned aerial vehicle includes:

a locating data acquisition module, configured to acquire multiple pieces of locating data obtained by a locating operation in the remote controller;

a target position determination module, configured to determine multiple target positions according to the multiple pieces of locating data;

a flight route calculation module, configured to calculate a flight route according to the multiple target positions; and a flight route sending module, configured to send the flight route to the unmanned aerial vehicle for flight according to the flight route.

In some embodiments of the application, the locating data acquisition module includes:

an original locating parameter reading submodule, configured to read multiple original locating parameters obtained by the locating operation over the remote controller in the remote controller; and a positioning data encapsulation submodule, configured to encapsulate the multiple original locating parameters into the multiple pieces of locating data according to a specified format.

In some embodiments of the application, the target position determination module includes:

an electronic map display submodule, configured to display an electronic map;

a locating position reading submodule, configured to read multiple locating positions from the multiple pieces of locating data according to the specified format;

a locating point icon display submodule, configured to display locating point icons in the electronic map according to the multiple locating positions; and a position determination submodule, configured to, when a confirmation operation for the locating point icons are detected, confirm the locating positions corresponding to the locating point icons to be the target positions.

In some embodiments of the application, the target position determination module further includes:

a deletion operation detection submodule, configured to detect a deletion operation for the locating point icons corresponding to the target positions; and a target position deletion submodule, configured to cancel positions of the locating point icons to be determined as the target positions according to the deletion operation.

In some embodiments of the application, the target position determination module further includes:

a movement operation detection submodule, configured to detect a movement operation for the locating point icons corresponding to the target positions;

a locating point icon movement submodule, configured to move the locating point icons in the electronic map according to the movement operation; and a position query submodule, configured to query positions corresponding to the moved locating point icons as the target positions.

In some embodiments of the application, the flight route calculation module includes:

a flight region generation submodule, configured to connect the multiple target positions to generate a flight region; and a route calculation submodule, configured to calculate the flight route in the flight region.

The embodiments of the application further disclose another remote controller, which includes:

a processor; and a memory configured to store an instruction executable for the processor, wherein the processor is configured to:

acquire multiple pieces of locating data obtained by a locating operation in the remote controller;

determine multiple target positions according to the multiple pieces of locating data;

calculate a flight route according to the multiple target positions; and send the flight route to an unmanned aerial vehicle for flight according to the flight route.

The embodiments of the application further disclose another remote controller, which includes:

a memory; and one or more than one program, wherein the one or more than one program is stored in the memory and is configured to be executed by one or more than one processor, and the one or more than one program includes an instruction configured to execute the following operations:

acquiring multiple pieces of locating data obtained by a locating operation in the remote controller;

determining multiple target positions according to the multiple pieces of locating data;

calculating a flight route according to the multiple target positions; and sending the flight route to an unmanned aerial vehicle for flight according to the flight route.

DETAILED DESCRIPTION OF THE EMBODIMENTS

For making the purpose, characteristics and advantages of the application obvious and easy to understand, the application will be further described below in combination with the drawings and specific implementation modes in detail.

Figure 1:
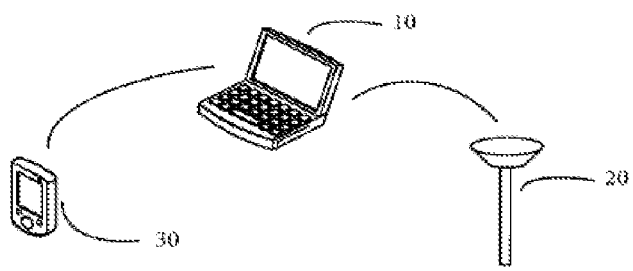
FIG. 1 is an architecture diagram of conventional equipment for calculating a flight route.
Figure 2:
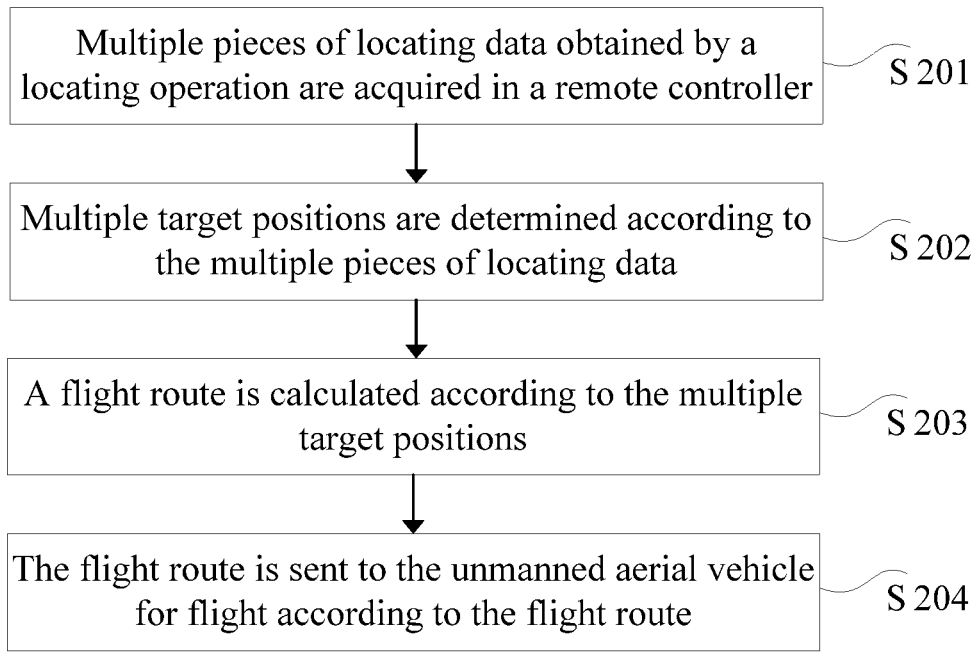
FIG. 2 is a step flowchart of an embodiment of a method for controlling flight of an unmanned aerial vehicle according to the application.

Referring to FIG. 2, a step flowchart of an embodiment of a method for controlling flight of an unmanned aerial vehicle according to the application is shown. The following steps may specifically be included.

In Step 201, multiple pieces of locating data obtained by a locating operation are acquired in a remote controller.

It is important to note that the remote controller in the embodiment of the application refers to a terminal controlling an unmanned aerial vehicle to execute operations of flight, agricultural plant protection and the like.

Wherein, the unmanned aerial vehicle may refer to an aerial vehicle controlled by wireless remote control or a program to execute a specific air task, for example, an unmanned aerial vehicle configured for agricultural plant protection. The unmanned aerial vehicle usually does not carry any operator, and may automatically fly or be remotely guided, and an aerodynamic force is adopted to provide a required lift force for the aerial vehicle.

In the embodiment of the application, a locating module may be configured in the remote controller, for example, a Global Positioning System (GPS) module (including a GPS chip, an antenna and the like), and is configured for the locating operation.

During specific implementation, the locating module may execute the locating operation in one or more of the following manners:

a satellite locating manner, a Wireless Fidelity (WIFI) locating manner, a base station locating manner, a cell Identity (ID) locating manner and an Advanced Forward Link Triangulation (AFLT) manner.

In the satellite locating manner, a position signal of the terminal may be sent to a locating background for locating. A satellite locating system available at present includes a GPS, GLONASS, a Beidou system, a Galileo system and the like.

In the WIFI locating manner, locating may be implemented according to strength of signals sent by a WIFI hotspots deployed everywhere and globally unique Media Access Control (MAC) addresses (or called as hardware addresses, configured to define positions of network equipment).

In the base station locating manner, the position of the terminal may be determined by virtue of a calculated distance of a distance between a base station of an operating company (for example, the mobile operating company, the unicom operating company and the telecommunication operating company) and the terminal.

In the cell ID locating manner, a cell number (which may be estimated according to the serving base station) corresponding to the terminal may be reported through a wireless network (for example, a cellular network), a position service platform translates the cell number into latitude and longitude coordinates.

In the AFLT manner, when the locating operation is executed, the terminal simultaneously monitors pilot information of multiple base stations (at least three base stations), distances between the terminal and the base stations nearby are determined by virtue of chip delays, and the position of the terminal is finally calculated by virtue of a triangulation method.

During specific implementation, the satellite locating manner, the base station locating manner, the WIFI locating manner and the like may be combined with several other locating manners, for example, the cell ID locating manner and the AFLT manner, for locating.

For example, a hybrid locating manner combining the satellite locating manner, the base station locating manner and the WIFI locating manner may be adopted for locating on a mobile phone.

Of course, the abovementioned locating manners are only exemplary, other locating manners may be set according to a practical condition when the embodiment of the application is implemented, and there are no limits made in the embodiment of the application. In addition, besides the abovementioned locating manners, those skilled in the art may further adopt other locating manners according to a practical requirement, which is also not limited in the embodiment of the application.

In an embodiment of the application, Step 201 may include the following sub-steps.

In Sub-step S11, multiple original locating parameters obtained by the locating operation over the remote controller are read in the remote controller.

In Sub-step S12, the multiple original locating parameters are encapsulated into the multiple pieces of locating data according to a specified format.

With the embodiment of the application, a user may carry the remote controller to move on an edge of a flight region (for example, a farmland), and the locating module in the remote controller may execute the locating operation according to a certain frequency (for example, once per second).

In the embodiment of the application, an operating system, for example, Android, of the remote controller may provide an Application Programming Interface (API) configured to call the locating module and read the original locating parameters obtained by the locating operation.

For example, for GPS data, a fixed GPS data output statement ($GPGGA) is a frame of main GPS locating data and is also data used most extensively.

Its standard format is:

$GPGGA,(1),(2),(3),(4),(5),(6),(7),(8),(9), M,(10),M,(11),(12)*hh(CR)(LF), for example:

$GPGGA,082006.000,3852.9276, N, 11527.4283,E,1,08, 1.0,20.6, M , , , 0000*35. Meanings corresponding to each part are as follows:

(1) locating Universal Time Code (UTC) time: 08:20:06;
(2) latitude (formant ddmm.mmmm, i.e., dd degrees and mm.mmmm minutes);
(3) N/S (north latitude or south latitude): 38 degrees and 52.9276 minutes north latitude;
(4) longitude (formant dddmm.mmmm, i.e., ddd degrees and mm.mmmm minutes);
(5) E/W (east longitude or west longitude): 115 degrees and 27.4283 minutes east longitude;
(6) quality factor (0=no locating, 1=real-time GPS, 2=differential GPS): 1=real-time GPS;
(7) the number of available satellites (0~8): the number of the available satellites=08;
(8) horizontal accuracy factor (1.0~99.9): the horizontal accuracy factor=1.0;
(9) antenna elevation (sea level, −9999.9~99999.9, unit: m): the antenna elevation=20.6 m;
(10) height of the ellipsoid of the earth relative to the sea level (−999.9~9999.9, unit: m): none;
(11) differential GPS data age, none during real-time GPS: none;
(12) differential reference station number (0000~1023), none during real-time GPS: none;
*: checksum field; hh: checksum number: 35; and (CR)(LF): carriage return and line feed.

In the embodiment of the application, the multiple original locating parameters may be encapsulated into the multiple pieces of locating data for storage according to the specified format.

For example, the specified format may include a specified original locating parameter, a specified field sequence, a format of a field and the like.

It is important to note that the specified format may refer to a data format directly applied to calculation of a flight route without data format conversion and may be set by those skilled in the art according to a practical condition, which is not limited in the embodiment of the application.

In Step 202, multiple target positions are determined according to the multiple pieces of locating data.

In the embodiment of the application, a screen, for example, a touch screen, may be configured in the remote controller to display an electronic map.

Wherein, the electronic map usually stores map data by virtue of a vector image, and the map may be scaled up, scaled down or rotated without influencing a display effect.

When the electronic map is drawn, multiple map layers are matched, and the map layers of the electronic map may include basic geographic information (for example, a river, a mountain and a plain), urban infrastructure construction and road planning information, Point of Interest (POI) labeling information and the like.

In the remote controller, multiple locating positions may be read from the multiple pieces of locating data according to the specified format. For example, the locating positions area read from specified fields in the locating data.

Locating point icons are displayed in the electronic map according to the multiple locating positions.

Figure 3A:
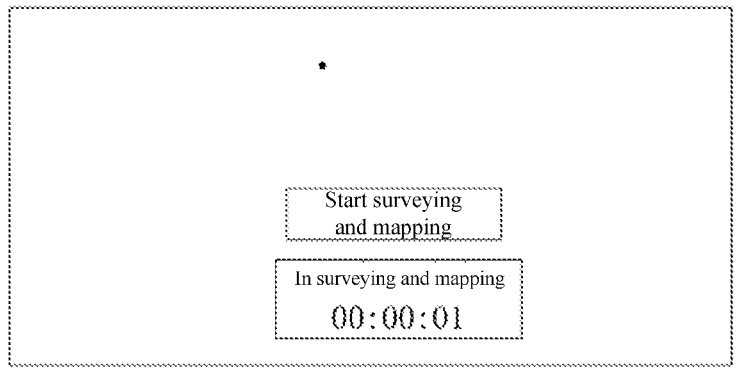
FIG. 3A-FIG. 3G are diagrams of a calculation example for a flight route according to the application.

As shown in FIG. 3A, if the user triggers an operation instruction of starting surveying and mapping, the locating operation may be started, and if a locating position is read, a locating point icon (i.e., a dot in the figure) may be displayed on the electronic map.

Figure 3B:
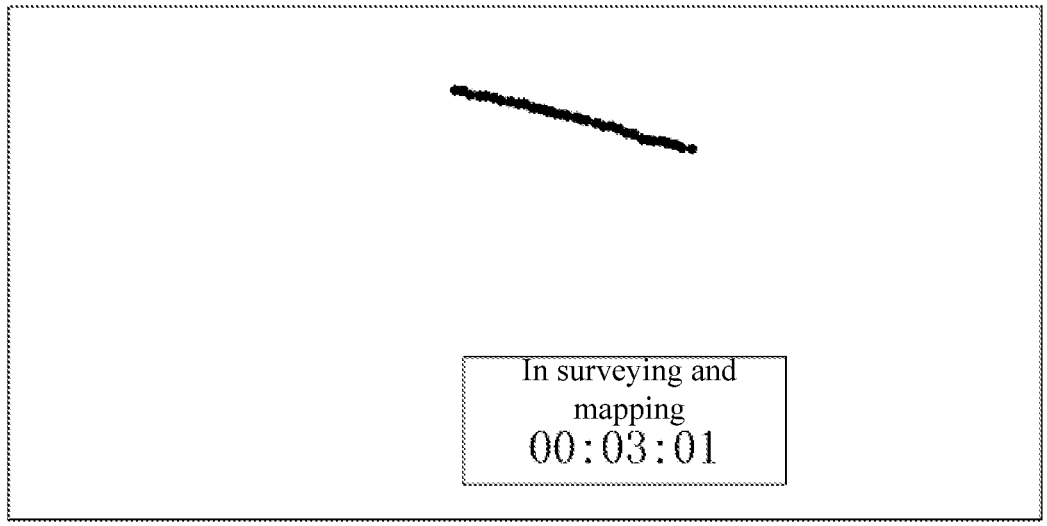

As shown in FIG. 3B, if N (N is a positive integer) locating positions are read, a series of locating point icons (i.e., dots in the figure) may be displayed on the electronic map, and the user may further press down a physical ton in the remote controller to record key locating positions.

Figure 3C:
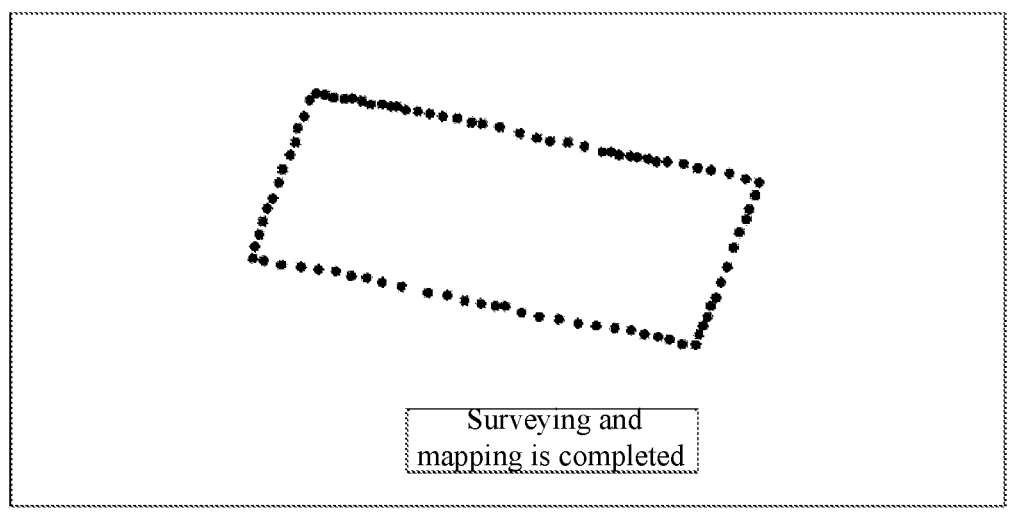

As shown in FIG. 3C, if the user triggers an operation instruction of completing surveying and mapping, the locating operation is ended, and the screen keeps displaying the locating point icons in the electronic map where all locating positions obtained by surveying and mapping of this time are located.

The locating point icons may be displayed to provide a flight region division reference for the user, and the user may trigger a confirmation operation, for example, clicking the locating point icons twice, pressing the locating point icons for long or reading the key locating positions selected by the user, to select the target positions from the locating positions.

When the confirmation operation for the locating point icons is detected, the locating positions corresponding to the locating point icons are confirmed to be the target positions.

Figure 3D:
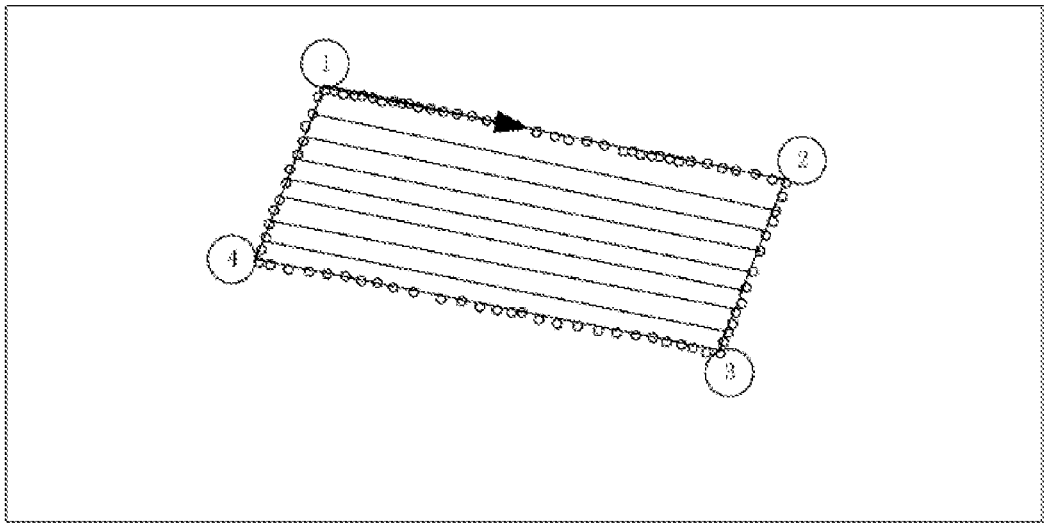

As shown in FIG. 3D, if the confirmation operation is detected at locating point icons ①, ②, ③ and ④, locating positions corresponding to the locating point icons ①, ②, ③ and ④ may be determined to be target positions.

In an embodiment of the application, if a certain target position is not a required target position, the user may trigger a deletion operation to delete the target position, for example, clicking the locating point icon twice, to cancel the target position.

In the remote controller, the deletion operation for the locating point icons corresponding to the target positions is detected.

If the deletion operation is detected, positions of the locating point icons may be canceled to be determined as the target positions according to the deletion operation.

Wherein, the positions may be locating positions and may also be positions in the electronic map.

Figure 3E:
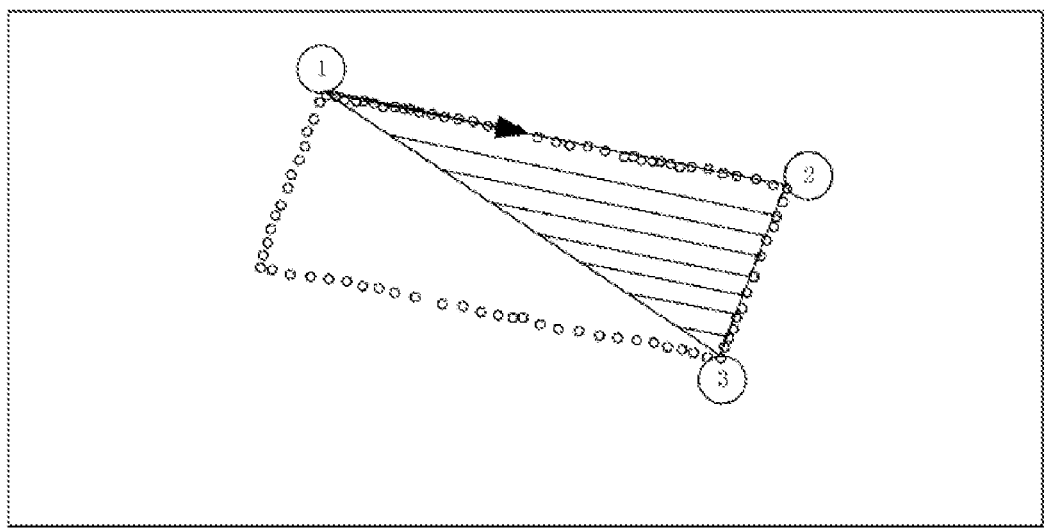

As shown in FIG. 3E, if a deletion operation for the locating point icon ④ in FIG. 3D is detected, a position of the locating point icon ④ may be canceled to be determined as the target position.

In another embodiment of the application, if a certain target position is not a required target position, the user may trigger a movement operation, for example, pressing the locating point icon for long, to move the target position.

In the remote controller, the movement operation for the locating point icons corresponding to the target positions is detected.

If the movement operation is detected, the locating point icons may be moved in the electronic map according to the movement operation, and positions corresponding to the moved locating point icons are queried in a manner of geographic coding and the like as the target positions.

Wherein, the positions may be locating positions and may also be positions in the electronic map.

Figure 3F:
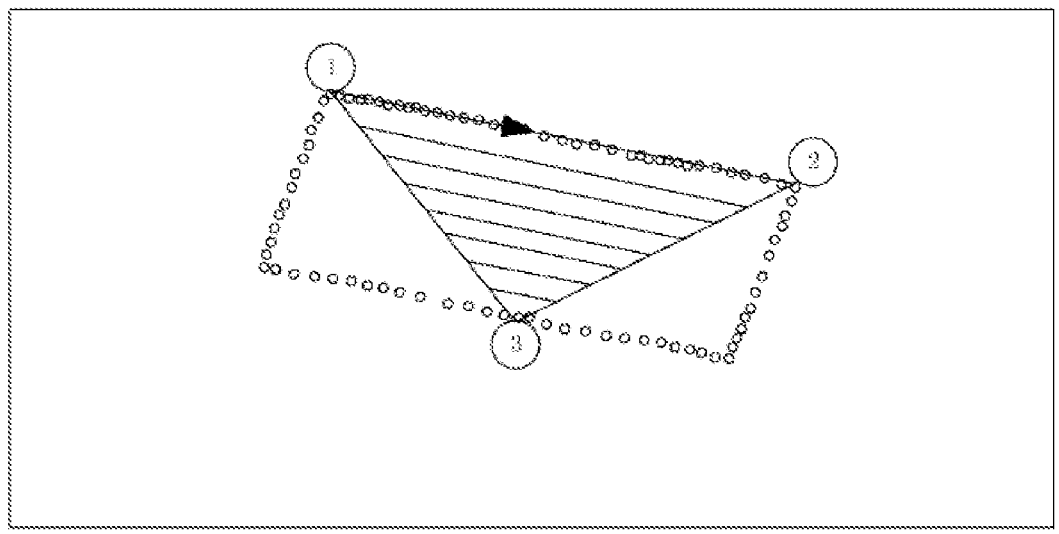

As shown in FIG. 3F, if a movement operation for the locating point icon ③ in FIG. 3E is detected, the locating point icon ③ may be moved to another position.

It is important to note that, in a movement process, the locating point icons of the locating positions may be reserved, and new locating point icons may be generated for display.

Of course, the abovementioned target position selection manner is only exemplary, another target position selection manner may be set according to a practical condition when the embodiment of the application is implemented, and there are no limits made in the embodiment of the application. In addition, besides the abovementioned target position selection manner, those skilled in the art may further adopt another target position selection manner according to a practical requirement, which is not limited in the embodiment of the application.

In Step 203, a flight route is calculated according to the multiple target positions.

During specific implementation, the flight route of the unmanned aerial vehicle may be designed according to the multiple (usually three or more than three) selected target positions.

The flight route is usually a set of waypoints, and the unmanned aerial vehicle may sequentially fly according to the set of the waypoints.

In an example, the waypoints may include data of a waypoint sequence number, a waypoint type, a latitude and longitude, a flight height, a flight speed, a head type and the like.

A data structure of a waypoint may be as follows:

```
WayPoint{
  int Index; //waypoint sequence number
  int Type; //waypoint type
  double Longitude; //longitude
  double Latitude; //latitude
  double Height; //flight height
  double Speed; //flight speed
  int HeadType; //head type
}.
```

Then, in the example, the flight route may include data of a waypoint count, waypoint array and the like of the route.

A data structure of the flight route may be as follows:

```
Route{
  int WayPointCount; //waypoint count of the route
  WayPoint[ ] WayPoints; //all waypoints, i.e., the waypoint array
}.
```

In an embodiment of the application, Step 203 may include the following sub-steps.

In Sub-step S21, multiple target positions are connected to generate a flight region.

In the embodiment of the application, the target positions may be sequentially connected clockwise or counterclockwise in a straight line manner and the like according to a selection sequence of the target positions to generate a closed flight region.

As shown in FIG. 3D, if the selection sequence of the target positions is ①, ②, ③ and ④, the target positions ①, ②, ③ and ④ may be sequentially connected to generate a closed quadrangular flight region.

In Sub-step S22, the flight route is calculated in the flight region.

During specific implementation, a starting route of the flight route may be calculated.

For ensuring largest flight coverage of the unmanned aerial vehicle in the flight region, a route from a first target position to a second target position may be determined as the starting route.

As shown in FIG. 3D, if the first target position is ① and the second target position is ②, a starting head may be the flight route (for example, the arrow direction) from ① to ②.

Of course, a route from the first target position to the last target position may also be the starting route, and the like, and there are no limits made in the embodiment of the application.

Then, parallel flight routes are designed by taking the starting route as a reference at an interval of a certain weight in the flight region.

Endpoints (including starting endpoints and termination endpoints) of these parallel flight routes are on a boundary of the flight region.

The starting endpoints and termination endpoints of adjacent flight routes are connected to form a connected flight route.

In the embodiment of the application, widths between adjacent flight routes in the same direction in the flight region may be determined by a width of a body of the unmanned aerial vehicle and may also be determined according to a practical aerial photographing requirement of the unmanned aerial vehicle, and the like.

For example, if a camera on the unmanned aerial vehicle is required to aerially photograph a region within 5 meters in the flight region, the widths between the adjacent flight routes are smaller than 5 meters.

In an embodiment of the application, if an obstacle, for example, an object influencing flight of the unmanned aerial vehicle like an electric pole, a lamp pole, a tree and a tall building, is queried in the electronic map or through the locating data, a detouring region may be calculated for a position of the obstacle, a flight route is determined on a boundary of the detouring region, then the unmanned aerial vehicle may bypass the obstacle and continue flying, and a head of the unmanned aerial flight may also be ensured to completely cover the flight region as much as possible.

It is important to note that, if the operations of deletion, movement and the like for the target positions are executed, as shown in FIG. 3E and FIG. 3F, the flight route is redesigned, that is, the multiple target positions are reconnected to generate a flight region and the flight route is calculated.

In Step 204, the flight route is sent to the unmanned aerial vehicle for flight according to the flight route.

During specific implementation, if the user triggers an uploading instruction for the flight route, the flight route may be uploaded to the unmanned aerial vehicle through a protocol, for example, a Transmission Control Protocol (TCP)/Internet Protocol (IP), NetBios Enhanced User Interface NetBEUI and Internet work Packet Exchange (IPX/SPX), of a Hypertext Transfer Protocol (HTTP), and the unmanned aerial vehicle executes operations, for example, agricultural plant protection, according to the flight route.

Figure 3G:
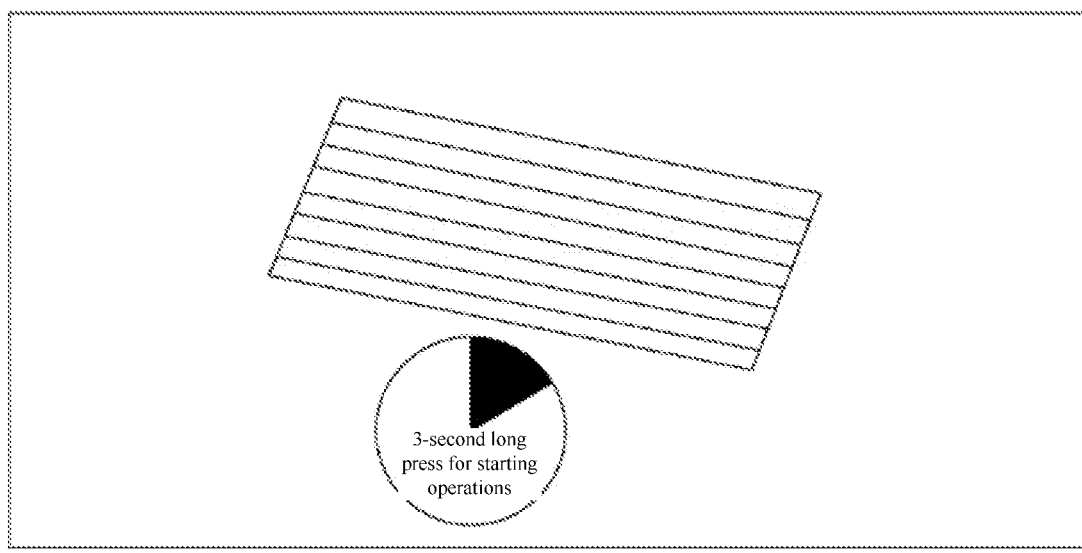

For example, as shown in FIG. 3G, the user may press a specified physical button on the remote controller for long (for example, 3-second long press for starting operations), thereby triggering the uploading instruction for the flight route.

According to the embodiment of the application, the locating module is integrated in the remote controller, and then the locating operation may be executed on the remote controller to obtain the locating data, thereby directly determining the target positions, calculating the flight route and controlling flight of the unmanned aerial vehicle. That is, the remote controller is integrated with three functions of flight region (for example, farmland) surveying and mapping, route drawing and remote control operation, so that, when the unmanned aerial vehicle is used for operations of plant protection and the like, only the remote controller is required to be carried, carrying of multiple sets of equipment is avoided, and hardware cost is reduced. Since remote control equipment is integrated with the surveying and mapping function, carrying of multiple kinds of equipment is avoided, that is, data exchange among multiple kinds of equipment is avoided, convenience for operation is further improved, operation efficiency of the unmanned aerial vehicle is improved, moreover, a probability of a data sending error during data exchange is reduced, and operation reliability of the unmanned aerial vehicle is improved.

It is important to note that, for simple description, the method embodiment is expressed into a combination of a series of actions. However, those skilled in the art should know that the embodiment of the application is not limited by an action sequence described herein because some steps may be executed in another sequence or at the same time according to the embodiment of the application. Second, those skilled in the art should also know that the embodiments described in the specification all belong to preferred embodiments and involved actions are not always necessary to the embodiments of the application.

Figure 4:
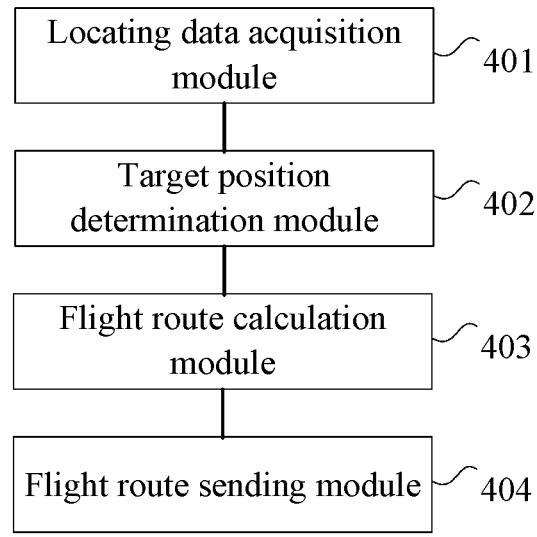
FIG. 4 is a structure block diagram of an embodiment of a device for controlling flight of an unmanned aerial vehicle according to the application.

Referring to FIG. 4, a structure block diagram of an embodiment of a device for controlling flight of an unmanned aerial vehicle according to the application is shown. The following modules may specifically be included:

a locating data acquisition module 401, configured to acquire multiple pieces of locating data obtained by a locating operation in a remote controller;

a target position determination module 402, configured to determine multiple target positions according to the multiple pieces of locating data;

a flight route calculation module 403, configured to calculate a flight route according to the multiple target positions; and a flight route sending module 404, configured to send the flight route to the unmanned aerial vehicle for flight according to the flight route.

In the embodiment of the application, the locating data acquisition module 401 may include the following submodules:

an original locating parameter reading submodule, configured to read multiple original locating parameters obtained by the locating operation over the remote controller in the remote controller; and a positioning data encapsulation submodule, configured to encapsulate the multiple original locating parameters into the multiple pieces of locating data according to a specified format.

In the embodiment of the application, the target position determination module 402 may include the following submodules:

an electronic map display submodule, configured to display an electronic map;

a locating position reading submodule, configured to read multiple locating positions from the multiple pieces of locating data according to the specified format;

a locating point icon display submodule, configured to display locating point icons in the electronic map according to the multiple locating positions; and a position determination submodule, configured to, when a confirmation operation for the locating point icons are detected, confirm the locating positions corresponding to the locating point icons to be the target positions.

In the embodiment of the application, the target position determination module 402 may further include the following submodules:

a deletion operation detection submodule, configured to detect a deletion operation for the locating point icons corresponding to the target positions; and a target position deletion submodule, configured to cancel positions of the locating point icons to be determined as the target positions according to the deletion operation.

In the embodiment of the application, the target position determination module 402 may further include the following submodules:

a movement operation detection submodule, configured to detect a movement operation for the locating point icons corresponding to the target positions;

a locating point icon movement submodule, configured to move the locating point icons in the electronic map according to the movement operation; and a position query submodule, configured to query positions corresponding to the moved locating point icons as the target positions.

In the embodiment of the application, the flight route calculation module 403 may include the following submodules:

a flight region generation submodule, configured to connect the multiple target positions to generate a flight region; and a route calculation submodule, configured to calculate the flight route in the flight region.

Figure 5:
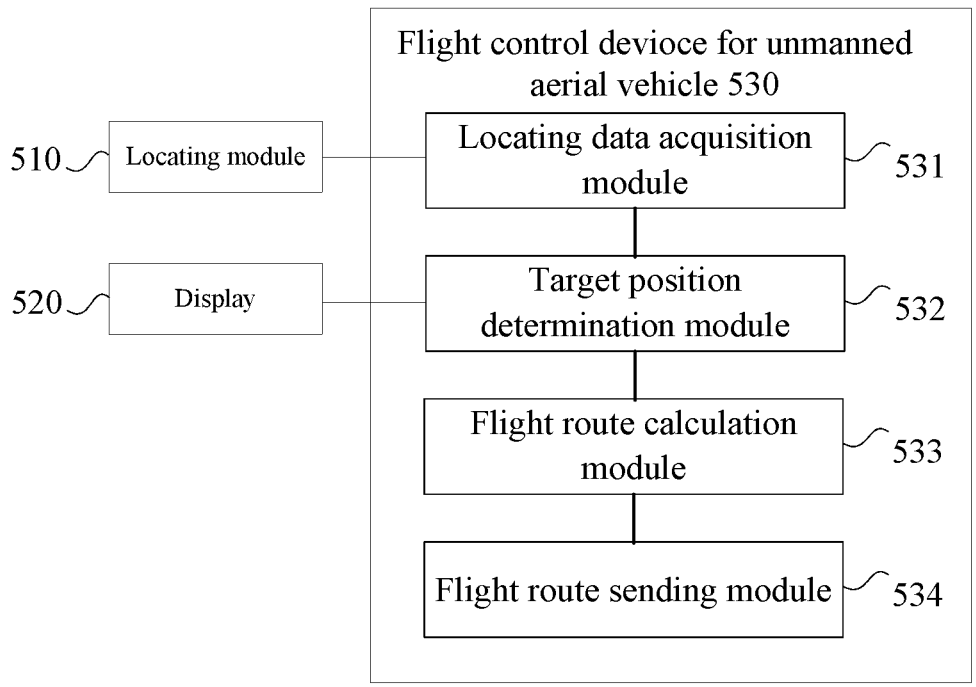
FIG. 5 is a structure block diagram of a remote controller according to the application.

Referring to FIG. 5, a structure block diagram of a remote controller according to the application is shown. The remote controller may include a locating module 510, a display 520 and a flight control device 530 for an unmanned aerial vehicle, wherein the flight control device 530 for the unmanned aerial vehicle may include the following modules:

a locating data acquisition module 531, configured to acquire multiple pieces of locating data obtained by a locating operation in the remote controller;

a target position determination module 532, configured to determine multiple target positions according to the multiple pieces of locating data;

a flight route calculation module 533, configured to calculate a flight route according to the multiple target positions; and a flight route sending module 534, configured to send the flight route to the unmanned aerial vehicle for flight according to the flight route.

In the embodiment of the application, the locating data acquisition module 531 may include the following submodules:

an original locating parameter reading submodule, configured to read multiple original locating parameters obtained by the locating operation over the remote controller in the remote controller; and a positioning data encapsulation submodule, configured to encapsulate the multiple original locating parameters into the multiple pieces of locating data according to a specified format.

In the embodiment of the application, the target position determination module 532 may include the following submodules:

an electronic map display submodule, configured to display an electronic map;

a locating position reading submodule, configured to read multiple locating positions from the multiple pieces of locating data according to the specified format;

a locating point icon display submodule, configured to display locating point icons in the electronic map according to the multiple locating positions; and a position determination submodule, configured to, when a confirmation operation for the locating point icons are detected, confirm the locating positions corresponding to the locating point icons to be the target positions.

In the embodiment of the application, the target position determination module 532 may further include the following submodules:

a deletion operation detection submodule, configured to detect a deletion operation for the locating point icons corresponding to the target positions; and a target position deletion submodule, configured to cancel positions of the locating point icons to be determined as the target positions according to the deletion operation.

In the embodiment of the application, the target position determination module 532 may further include the following submodules:

a movement operation detection submodule, configured to detect a movement operation for the locating point icons corresponding to the target positions;

a locating point icon movement submodule, configured to move the locating point icons in the electronic map according to the movement operation; and a position query submodule, configured to query positions corresponding to the moved locating point icons as the target positions.

In the embodiment of the application, the flight route calculation module 533 may include the following submodules:

a flight region generation submodule, configured to connect the multiple target positions to generate a flight region; and a route calculation submodule, configured to calculate the flight route in the flight region.

The methods of the device and the remote controller are substantially similar to the method embodiment and thus are described simply, and related parts may refer to part of descriptions in the method embodiment.

Correspondingly, the embodiments of the application further provide a remote controller, which includes:

a processor; and a memory configured to store an instruction executable for the processor, wherein the processor is configured to:

acquire multiple pieces of locating data obtained by a locating operation in the remote controller;

determine multiple target positions according to the multiple pieces of locating data;

calculate a flight route according to the multiple target positions; and send the flight route to an unmanned aerial vehicle for flight according to the flight route.

Correspondingly, the embodiments of the application further provide a remote controller, which includes:

a memory; and one or more than one program, wherein the one or more than one program is stored in the memory and is configured to be executed by one or more than one processor, and the one or more than one program includes an instruction configured to execute the following operations:

acquiring multiple pieces of locating data obtained by a locating operation in the remote controller;

determining multiple target positions according to the multiple pieces of locating data;

calculating a flight route according to the multiple target positions; and sending the flight route to an unmanned aerial vehicle for flight according to the flight route.

Figure 6:
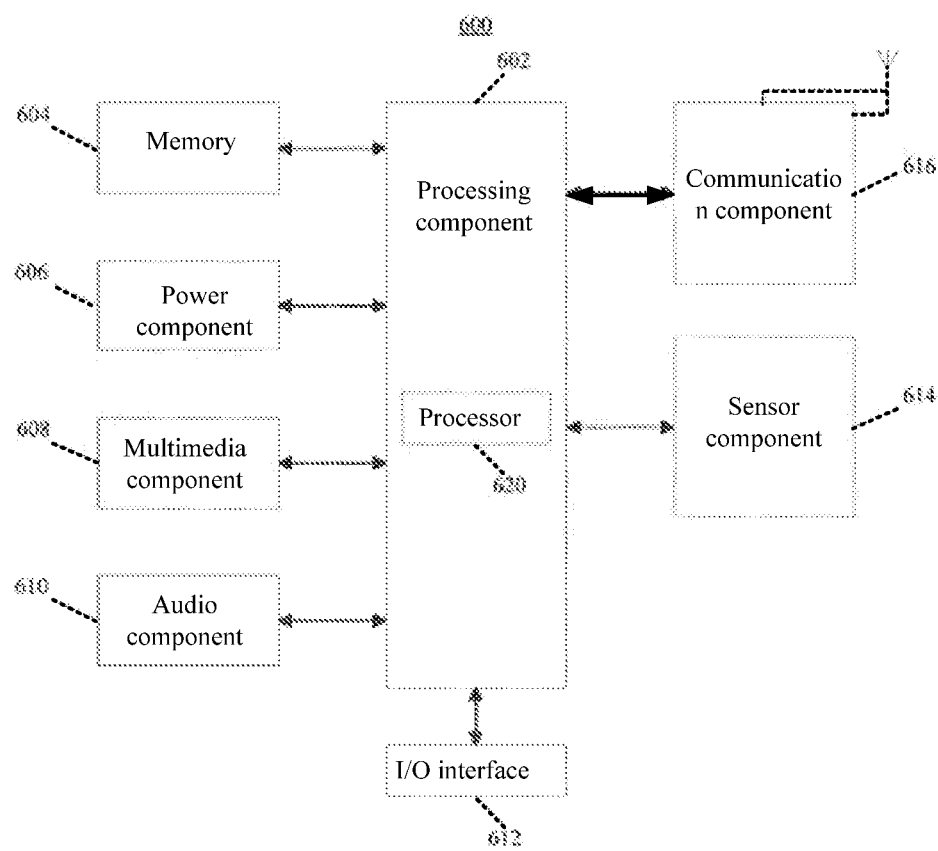
FIG. 6 is a structure diagram of a flight control device according to the application.

FIG. 6 is a block diagram of a flight control device 600 according to an exemplary embodiment. For example, the device 600 may be an unmanned aerial vehicle, an unmanned vehicle, an unmanned ship, a mobile phone, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the abovementioned method. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operation of the device 600. Examples of such data include instructions for any application programs or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the device 600. The power component 606 may include a power management system, one or more power supplies, and other components associated with the generation, management and distribution of power for the device 600.

The multimedia component 608 includes a screen providing an output interface between the device 600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some embodiments, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a Microphone (MIC), and the MIC is configured to receive an external audio signal when the device 600 is in the operation mode, such as a call mode, a recording mode and a voice recognition mode. The received audio signal may be further stored in the memory 604 or sent through the communication component 616. In some embodiments, the audio component 610 further includes a speaker configured to output the audio signal.

The I/O interface 612 provides an interface between the processing component and a peripheral interface module, and the peripheral interface module may be a keyboard, a click wheel, a button and the like. The button may include, but not limited to: a home button, a volume button, a starting button and a locking button.

The sensor component 614 includes one or more sensors configured to provide status assessment in various aspects for the device 600. For instance, the sensor component 614 may detect an on/off status of the device 600 and relative positioning of components, such as a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some embodiments, the sensor component 614 may also include a locating module, an acceleration sensor, a gyroscope sensor, a magnetic sensor, a pressure sensor or a temperature sensor.

The communication component 616 is configured to facilitate wired or wireless communication between the device 600 and other equipment. The device 600 may access a communication-standard-based wireless network, such as a WIFI network, a 2nd-Generation (2G) or 3rd-Generation (3G) network or a combination thereof. In an exemplary embodiment, the communication component 616 receives a broadcast signal or broadcast associated information from an external broadcast management system through a broadcast channel. In an exemplary embodiment, the communication component 616 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and another technology.

In an exemplary embodiment, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 604 including an instruction, and the instruction may be executed by the processor 620 of the device 600 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

Each embodiment in the specification is described in a progressive manner, each embodiment focuses on descriptions about differences with the other embodiments and the same and similar parts between each embodiment may refer to each other.

Those skilled in the art should know that the embodiment of the application may be provided as a method, a device or a computer program product. Therefore, the embodiment of the application may adopt a form of pure hardware embodiment, pure software embodiment and combined software and hardware embodiment. Moreover, the embodiment of the application may adopt a form of computer program product implemented on one or more computer-available storage media (including, but not limited to, a disk memory, a CD-ROM and an optical memory) including computer-available program codes.

The embodiment of the application is described with reference to flowcharts and/or block diagrams of the method, terminal equipment (system) and computer program product according to the embodiment of the application. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

Although the preferred embodiments of the embodiments of the application have been described, those skilled in the art may make additional variations and modifications to these embodiments once obtaining the basic creative concept. Therefore, the appended claims are intended to be explained to include the preferred embodiments and all the variations and modifications falling within the scope of the embodiments of the application.

It is finally important to note that, in the invention, relational terms such as first and second are adopted not always to require or imply existence of any such practical relationship or sequence between these entities or operations but only to distinguish one entity or operation from another entity or operation. Moreover, terms "include", "have" or any other variation thereof are intended to cover nonexclusive inclusions, so that a process, method, object or terminal equipment including a series of elements not only includes those elements, but also includes other elements which are not clearly listed or further includes elements intrinsic to the process, the method, the object or the terminal equipment. Under the circumstance of no more limits, an element limited by a statement "including a/an . . . " does not exclude existence of the same other element in a process, method, object or terminal equipment including the element.

The flight control method for the unmanned aerial vehicle, flight control device for the unmanned aerial vehicle and remote controller provided by the application are introduced above in detail, the principle and implementation modes of the application are elaborated in the invention with specific examples, and the descriptions about the abovementioned embodiments are only adopted to help the method of the application and a core concept thereof to be understood. In addition, those of ordinary skilled in the art may make variations to the specific implementation modes and the application scope according to the concept of the application. From the above, the contents of the specification should not be understood as limits to the application.

What is claimed is:

1. A method for controlling flight of an unmanned aerial vehicle, comprising:
    acquiring, by a remote controller, multiple pieces of locating data obtained by a locating operation in the remote controller, wherein the multiple pieces of locating data are determined through a locating operation performed by a locating module in the remote controller;
    determining, by a remote controller, multiple target positions according to the multiple pieces of locating data;
    calculating, by a remote controller, a flight route according to the multiple target positions; and
    sending, by a remote controller, the flight route to the unmanned aerial vehicle for flight according to the flight route.

2. The method as claimed in claim 1, wherein the step of acquiring the multiple pieces of locating data obtained by the locating operation in the remote controller comprises:
    reading multiple original locating parameters obtained by the locating operation over the remote controller in the remote controller; and
    encapsulating the multiple original locating parameters into the multiple pieces of locating data according to a specified format.

3. The method as claimed in claim 2, wherein the step of determining the multiple target positions according to the multiple pieces of locating data comprises:
    displaying an electronic map;
    reading multiple locating positions from the multiple pieces of locating data according to the specified format;
    displaying locating point icons in the electronic map according to the multiple locating positions; and
    when a confirmation operation for the locating point icons is detected, confirming the locating positions corresponding to the locating point icons to be the target positions.

4. The method as claimed in claim 1, wherein the step of determining the multiple target positions according to the multiple pieces of locating data comprises:
    displaying an electronic map;
    reading multiple locating positions from the multiple pieces of locating data according to the specified format;
    displaying locating point icons in the electronic map according to the multiple locating positions; and
    when a confirmation operation for the locating point icons is detected, confirming the locating positions corresponding to the locating point icons to be the target positions.

5. The method as claimed in claim 4, wherein the step of determining the multiple target positions according to the multiple pieces of locating data further comprises:
    detecting a deletion operation for the locating point icons corresponding to the target positions; and
    cancelling positions of the locating point icons to be determined as the target positions according to the deletion operation.

6. The method as claimed in claim 4, wherein the step of determining the multiple target positions according to the multiple pieces of locating data further comprises:
    detecting a movement operation for the locating point icons corresponding to the target positions;
    moving the locating point icons in the electronic map according to the movement operation; and
    querying positions corresponding to the moved locating point icons as the target positions.

7. The method as claimed in claim 1, wherein the step of calculating the flight route according to the multiple target positions comprises:
    connecting the multiple target positions to generate a flight region; and
    calculating the flight route in the flight region.

8. A device for controlling flight of an unmanned aerial vehicle, comprising:
    a locating data acquisition module, configured to acquire multiple pieces of locating data obtained by a locating operation in a remote controller, wherein the multiple pieces of locating data are determined through a locating operation performed by a locating module in the remote controller;
    a target position determination module, configured to determine multiple target positions according to the multiple pieces of locating data;

a flight route calculation module, configured to calculate a flight route according to the multiple target positions; and a flight route sending module, configured to send the flight route to the unmanned aerial vehicle for flight according to the flight route.

9. The device as claimed in claim 8, wherein the locating data acquisition module comprises:

an original locating parameter reading submodule, configured to read multiple original locating parameters obtained by the locating operation over the remote controller in the remote controller; and a positioning data encapsulation submodule, configured to encapsulate the multiple original locating parameters into the multiple pieces of locating data according to a specified format.

10. The device as claimed in claim 8, wherein the target position determination module comprises:

an electronic map display submodule, configured to display an electronic map;

a locating position reading submodule, configured to read multiple locating positions from the multiple pieces of locating data according to the specified format;

a locating point icon display submodule, configured to display locating point icons in the electronic map according to the multiple locating positions; and a position determination submodule, configured to, when a confirmation operation for the locating point icons are detected, confirm the locating positions corresponding to the locating point icons to be the target positions.

11. The device as claimed in claim 10, wherein the target position determination module further comprises:

a deletion operation detection submodule, configured to detect a deletion operation for the locating point icons corresponding to the target positions; and a target position deletion submodule, configured to cancel positions of the locating point icons to be determined as the target positions according to the deletion operation.

12. The device as claimed in claim 10, wherein the target position determination module further comprises:

a movement operation detection submodule, configured to detect a movement operation for the locating point icons corresponding to the target positions;

a locating point icon movement submodule, configured to move the locating point icons in the electronic map according to the movement operation; and a position query submodule, configured to query positions corresponding to the moved locating point icons as the target positions.

13. The device as claimed in claim 8, wherein the flight route calculation module comprises:

a flight region generation submodule, configured to connect the multiple target positions to generate a flight region; and a route calculation submodule, configured to calculate the flight route in the flight region.

14. A remote controller, comprising a locating module, a display and the device for controlling flight of the unmanned aerial vehicle, wherein the device for controlling flight of the unmanned aerial vehicle comprise: a processor; and a memory configured to store instructions executable for the processor, wherein the processor is configured to execute the functions of the following program unit:

a locating data acquisition module, configured to acquire multiple pieces of locating data obtained by a locating operation in a remote controller, wherein the multiple pieces of locating data are determined through a locating operation performed by a locating module in the remote controller;

a target position determination module, configured to determine multiple target positions according to the multiple pieces of locating data;

a flight route calculation module, configured to calculate a flight route according to the multiple target positions; and a flight route sending module, configured to send the flight route to the unmanned aerial vehicle for flight according to the flight route.

15. The remote controller as claimed in claim 14, wherein the locating data acquisition module comprises:

an original locating parameter reading submodule, configured to read multiple original locating parameters obtained by the locating operation over the remote controller in the remote controller; and a positioning data encapsulation submodule, configured to encapsulate the multiple original locating parameters into the multiple pieces of locating data according to a specified format.

16. The remote controller as claimed in claim 15, wherein the target position determination module comprises:

an electronic map display submodule, configured to display an electronic map;

a locating position reading submodule, configured to read multiple locating positions from the multiple pieces of locating data according to the specified format;

a locating point icon display submodule, configured to display locating point icons in the electronic map according to the multiple locating positions; and a position determination submodule, configured to, when a confirmation operation for the locating point icons are detected, confirm the locating positions corresponding to the locating point icons to be the target positions.

17. The remote controller as claimed in claim 14, wherein the target position determination module comprises:

an electronic map display submodule, configured to display an electronic map;

a locating position reading submodule, configured to read multiple locating positions from the multiple pieces of locating data according to the specified format;

a locating point icon display submodule, configured to display locating point icons in the electronic map according to the multiple locating positions; and a position determination submodule, configured to, when a confirmation operation for the locating point icons are detected, confirm the locating positions corresponding to the locating point icons to be the target positions.

18. The remote controller as claimed in claim 17, wherein the target position determination module further comprises:

a deletion operation detection submodule, configured to detect a deletion operation for the locating point icons corresponding to the target positions; and a target position deletion submodule, configured to cancel positions of the locating point icons to be determined as the target positions according to the deletion operation.

19. The remote controller as claimed in claim 17, wherein the target position determination module further comprises:

a movement operation detection submodule, configured to detect a movement operation for the locating point icons corresponding to the target positions;

a locating point icon movement submodule, configured to move the locating point icons in the electronic map according to the movement operation; and a position query submodule, configured to query positions corresponding to the moved locating point icons as the target positions.

20. The remote controller as claimed in 14, wherein the flight route calculation module comprises:
   a flight region generation submodule, configured to connect the multiple target positions to generate a flight region; and
   a route calculation submodule, configured to calculate the flight route in the flight region.

* * * * *